United States Patent
Gruber et al.

(10) Patent No.: US 10,974,609 B2
(45) Date of Patent: Apr. 13, 2021

(54) CHARGING DEVICE FOR AN ENERGY STORE OF A MOTOR VEHICLE, AND ALSO ELECTRICAL MACHINE ARRANGEMENT WHICH IS EQUIPPED WITH SAID CHARGING DEVICE

(71) Applicant: Bayerische Motoren Werke Aktiengesellschaft, Munich (DE)

(72) Inventors: Dominik Gruber, Munich (DE); Joerg Reuss, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/363,243

(22) Filed: Mar. 25, 2019

(65) Prior Publication Data

US 2019/0222053 A1 Jul. 18, 2019

Related U.S. Application Data

(63) Continuation of application No. PCT/EP2017/078396, filed on Nov. 7, 2017.

(30) Foreign Application Priority Data

Dec. 15, 2016 (DE) ...................... 10 2016 225 108.2

(51) Int. Cl.
*B60L 53/14* (2019.01)
*B60L 53/20* (2019.01)
(Continued)

(52) U.S. Cl.
CPC .............. *B60L 53/14* (2019.02); *B60L 53/20* (2019.02); *B60L 58/20* (2019.02); *H02J 7/02* (2013.01);
(Continued)

(58) Field of Classification Search
CPC ........................................................ H02J 7/04
(Continued)

(56) References Cited

U.S. PATENT DOCUMENTS

2010/0222953 A1* 9/2010 Tang ................... B60L 15/2036
701/22
2011/0273136 A1* 11/2011 Yoshimoto .............. H02M 1/10
320/103
(Continued)

FOREIGN PATENT DOCUMENTS

DE 10 2013 205 164 B3 3/2014

OTHER PUBLICATIONS

International Search Report (PCT/ISA/210) issued in PCT Application No. PCT/EP2017/078396 dated Feb. 5, 2018 with English translation (four (4) pages).
(Continued)

*Primary Examiner* — Edward Tso
*Assistant Examiner* — Ahmed H Omar
(74) *Attorney, Agent, or Firm* — Crowell & Moring LLP

(57) ABSTRACT

A charging device charges energy stores of an electrical machine arrangement for a motor vehicle. The charging device has a primary side with a first connection for connection to a power supply system and a secondary side with a second connection for connection to a second energy store. The charging device has, on the primary side, a third connection for connection to a first energy store and is provided with a control circuit for switching over the load flux such that, via the second connection, energy can be transmitted from the second energy store, via the third connection, to the first energy store.

11 Claims, 3 Drawing Sheets

(51) Int. Cl.
  *B60L 58/20* (2019.01)
  *H02J 7/02* (2016.01)
  *H02J 7/34* (2006.01)
  *H02J 7/04* (2006.01)

(52) U.S. Cl.
  CPC .............. *H02J 7/04* (2013.01); *H02J 7/342* (2020.01); *B60L 2210/10* (2013.01); *B60L 2220/42* (2013.01); *Y02T 10/64* (2013.01); *Y02T 10/70* (2013.01); *Y02T 10/7072* (2013.01); *Y02T 90/12* (2013.01); *Y02T 90/14* (2013.01)

(58) Field of Classification Search
  USPC .................................................. 320/104, 109
  See application file for complete search history.

(56) References Cited

U.S. PATENT DOCUMENTS

2013/0264869 A1\* 10/2013 Klinkig ................ F02N 11/087
  307/10.6
2017/0232851 A1\* 8/2017 Unno ....................... H02J 7/24
  307/10.1

OTHER PUBLICATIONS

German-language Written Opinion (PCT/ISA/237) issued in PCT Application No. PCT/EP2017/078396 dated Feb. 5, 2018 (seven (7) pages).
German-language Office Action issued in counterpart German Application No. 10 2016 225 108.2 dated Jul. 26, 2017 with partial English translation (11 pages).
Tschoeke, Helmut, "Die Elektrifizierung des Antriebsstrangs", Springer Vieweg, pp. 80-85, (eight (8) pages).

\* cited by examiner

CHARGING DEVICE FOR AN ENERGY STORE OF A MOTOR VEHICLE, AND ALSO ELECTRICAL MACHINE ARRANGEMENT WHICH IS EQUIPPED WITH SAID CHARGING DEVICE

CROSS REFERENCE TO RELATED APPLICATIONS

This application is a continuation of PCT International Application No. PCT/EP2017/078396, filed Nov. 7, 2017, which claims priority under 35 U.S.C. § 119 from German Patent Application No. 10 2016 225 108.2, filed Dec. 15, 2016, the entire disclosures of which are herein expressly incorporated by reference.

BACKGROUND AND SUMMARY OF THE INVENTION

The present invention relates to a charging device for charging energy stores of an electric machine arrangement for a motor vehicle, to an electric machine arrangement for a motor vehicle, and to a motor vehicle equipped with said charging device.

It is known, according to FIG. 1, to provide two energy stores 24, 34, which are designed as high-voltage stores (HVS) and able to be charged by means of a charging device 50', and two electric machines 22, 32, which are connected by means of a respective inverter 23 and 33, for the respective driving of the two vehicle axles, in an electric 4-wheel drive for a motor vehicle. The two machines and their associated high-voltage stores in this case meet different requirements or fulfil different functions. One store 24 can be designed in this case as a so-called high-power store (HP store) having power-optimized cells, the other store 34 can be designed as a so-called high-energy store (HE store) having energy-optimized cells. The electric machine 22 associated with the high-power store 24 is preferably an electric machine for acceleration and optimized for power density, whereas the electric machine 32 associated with the high-energy store 34 is preferably an electric machine for constant travel and optimized for efficiency. In order to be able to ensure a charge balance between the two energy stores, a DC/DC converter 38 is provided in an intermediate circuit 39 between the two energy stores. It is disadvantageous that such a DC/DC converter requires additional installation space and involves corresponding switching losses or transmission losses.

The present invention is based on the object of eliminating these disadvantages and improving the energy supply in an electric machine arrangement for a motor vehicle comprising two electric machines to the extent that said arrangement requires less installation space and has reduced switching losses.

This object is achieved by way of a charging device for charging energy stores of the electric machine arrangement, as well as by an electric machine arrangement equipped with said charging device in accordance with embodiments of the invention.

According to the invention, a charging device for charging energy stores of an electric machine arrangement for a motor vehicle comprises a primary side and a secondary side. Provided on the primary side is a first terminal for connection to an electrical power supply system, such as, for example, the known AC voltage system having a voltage of 230 V. Provided on the secondary side is a second terminal for connection to a second energy store of the electric machine arrangement for the motor vehicle. The charging device is characterized in that it has on the primary side, a third terminal for connection to a first energy store of the electric machine arrangement and is furthermore equipped with a control circuit, which is often also referred to as a control structure, which can switch over the load flows or current flows so that current can flow from the second energy store via the second terminal to the first energy store via the third terminal. In other words, energy can be transmitted from the second energy store to the first energy store in this way. On account of the mentioned configuration, the charging device according to the invention can be used instead of the DC/DC converter since the charging device can undertake the function of the DC/DC converter. Therefore, the installation space and the weight that a DC/DC converter would otherwise take up can be "saved". Furthermore, the switching losses otherwise occurring at the DC/DC converter can be prevented or greatly reduced, and costs can be saved by omitting the DC/DC converter.

It may be advantageous when the third terminal and the first terminal are integrated to form a joint terminal. In this way, different plugs can be plugged in, for example, at the same terminal depending on requirements or the switching situation, for example a mains plug or a connecting plug to the first energy store, or it is possible to switch over between the two components of the integrated terminal.

According to one advantageous embodiment, the charging device is designed so that it is suitable for charging the first energy store designed as an energy store having power-optimized cells—that is to say for delivering a high power—and for charging the second energy store designed as an energy store having energy-optimized cells—that is to say for delivering the greatest possible amount of energy.

According to a further advantageous embodiment, the charging device is designed so that it makes an operating voltage of 200 to 1000 V, preferably 260 to 400 V, in the energy stores possible.

The electric machine arrangement according to the invention for a motor vehicle comprises a first electric machine, a first energy store connected to the first electric machine for supplying electrical power thereto, a second electric machine and a second energy store connected to the second electric machine for supplying electrical power thereto. The electric machine arrangement is characterized in that a charging device according to the above description is connected between the first energy store and the second energy store and serves as a DC/DC converter for transmitting energy from the second energy store to the first energy store. Therefore, the same or similar advantages are achieved in the electric machine arrangement according to the invention as have already been described in connection with the charging device according to the invention.

According to one advantageous development of the electric machine arrangement, a switching arrangement is provided, which makes it possible to produce and disconnect the connection between the first energy store and the third terminal of the charging device. By closing the switches of the switching arrangement, the charging device can therefore be brought into a switching state in which—when the first terminal is not connected—it is used to balance the two energy stores, wherein the charging device functions as a DC/DC converter when the first energy store is charged by the second energy store. In contrast, if the first terminal is connected to the electrical power supply and if the switches of the switching arrangement are opened, only the second energy store is charged; the first energy store is not concomitantly charged, however.

According to one advantageous embodiment of the electric machine arrangement, the first energy store is an energy store having power-optimized cells for providing a high power—for example for acceleration of the motor vehicle—and the second energy store is an energy store having energy-optimized cells for providing the highest possible amount of energy—for example for making the longest possible travel route possible (without large acceleration power levels).

The first energy store and the second energy store are preferably designed so that they have an operating voltage of 200 to 1000 V, preferably an operating voltage of 260 to 400 V.

The object mentioned at the beginning is furthermore achieved by a motor vehicle, which has an electric machine arrangement according to the invention. Accordingly, the same or similar advantages are also produced as those in connection with the above description, for which reason reference is made to the above statements in connection with the apparatus according to the invention in order to avoid repetitions.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
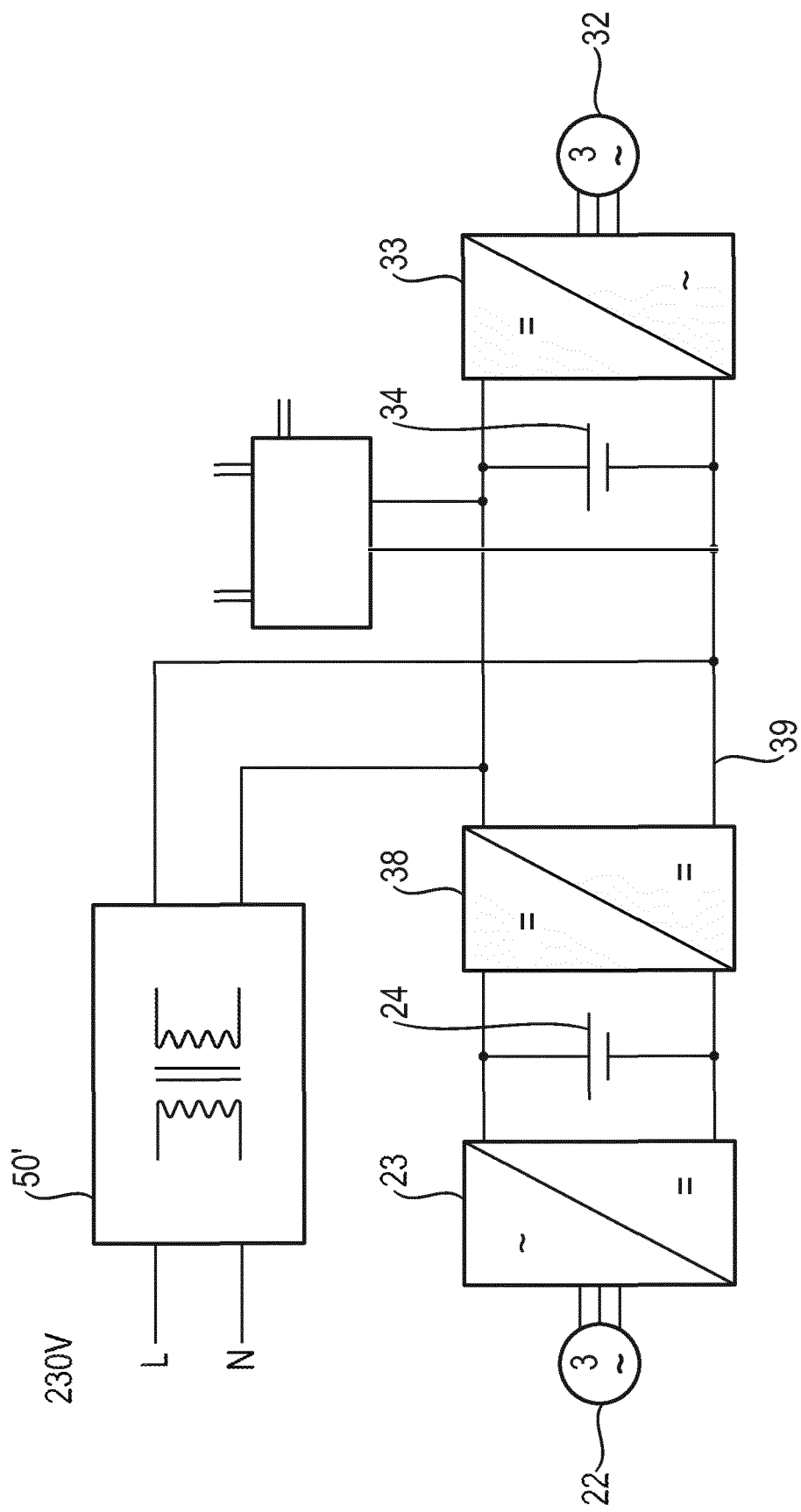
FIG. 1 is a schematic diagram of an electric machine arrangement according to the prior art.
Figure 2:
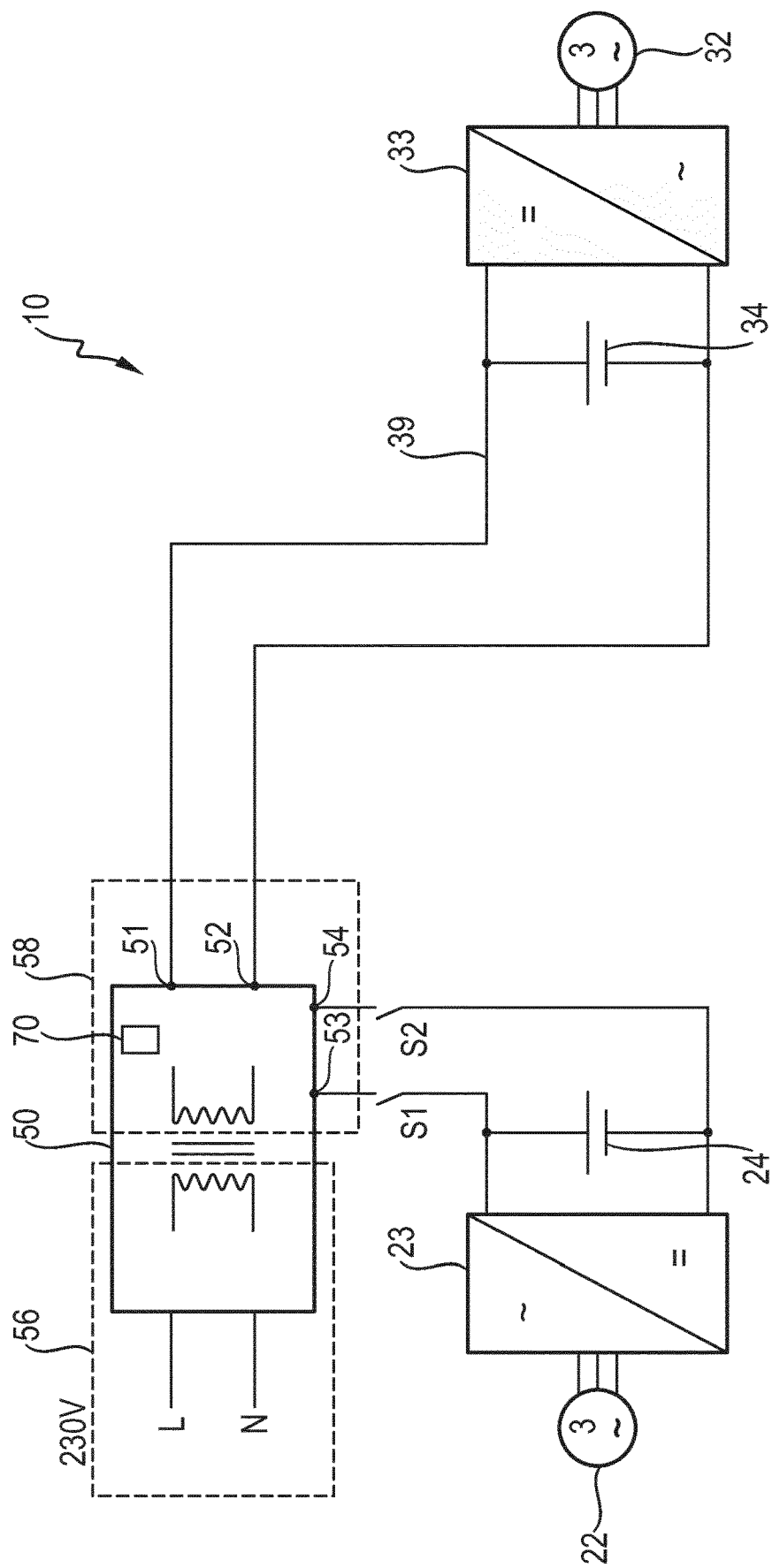
FIG. 2 is a schematic diagram of an electric machine arrangement according to an embodiment of the present invention.

FIG. 2 illustrates an embodiment of an electric machine arrangement 10 according to the invention—which is usually installed in a motor vehicle. In FIG. 2, identical reference signs are used for identical elements, as have already been partly described with reference to FIG. 1. A first electric machine 22 (in this case illustrated schematically and by way of example in a three-phase manner) is supplied with power by a first energy store 24 via an inverter 23. A second electric machine 32 (in this case likewise illustrated schematically and by way of example in a three-phase manner) is supplied with power by a second energy store 34 via an inverter 33.

A charging device 50 is provided for charging the energy stores. The charging device 50 has on a primary side 56 a first terminal having the terminal poles L and N, which in this case by way of example stand for a "normal" electrical power supply system with 230 V. The charging device 50 has on a secondary side 58 a second terminal having the terminal poles 51 and 52, at which the charging device 50 is connected to the second energy store 34. The basic structure of such a charging device is known. An example of this is described in detail in the book by Helmut Tschöke: "The electrification of the drivetrain", ISBN 978-3-658-04643-9, in particular pages 80-85. Further components of the charging device 50 (compare FIG. 3), such as, for example, the PFCs (power factor correction units) 59 and the corresponding switches, etc. arranged both on the primary side 56 and on the secondary side 58 for reasons of EMC compatibility, are therefore not described in detail since they can be assumed to be known.

Figure 3:
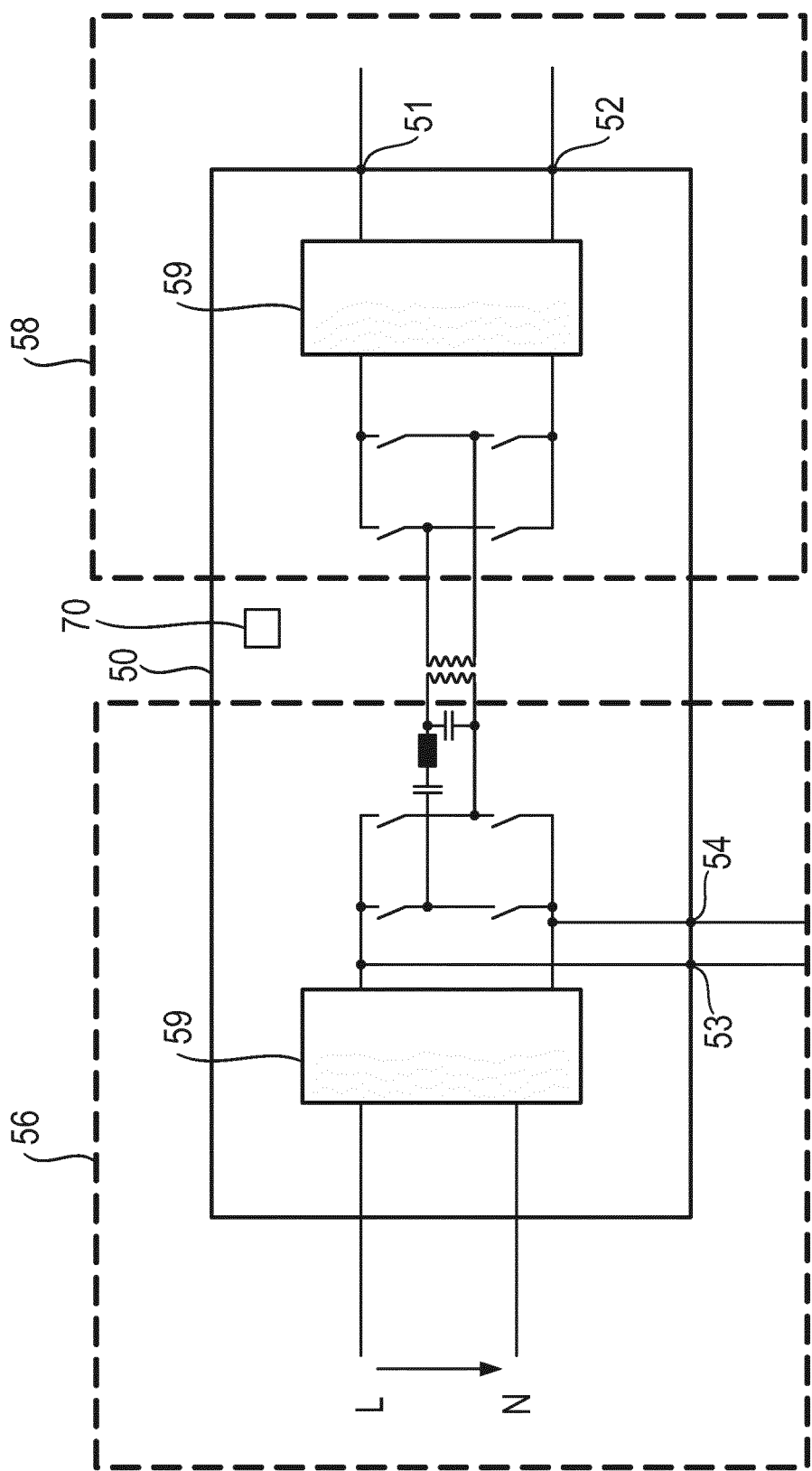
FIG. 3 is a schematic diagram of a charging device according to an embodiment of the invention.

The charging device 50 furthermore has a third terminal having the terminal poles 53 and 54, compare also FIG. 3, which are connected on the primary side 56 to the lines leading to the terminal poles L and N, respectively. The two terminal poles 53 and 54 can be connected to the first energy store 24 by a switching arrangement (having the switches S1 and S2). Finally, the charging device has a control circuit 70 (illustrated only schematically). The control circuit 70 is designed so that it can switch over the load or current flows in the charging device 50 so that, on the one hand, current can flow from the first terminal poles L, N over the primary side 56 to the secondary side 58 and then further to the second energy store 34 via the second terminal poles 51, 52, whereby the second energy store can be charged. In this case, the control circuit 70 ensures that the switching arrangement having the switches S1 and S2 is open and therefore there is no connection between the two terminal poles 53, 54 and the first energy store 24. On the other hand, the control circuit 70 can close the two switches S1 and S2 and switch the load currents (for example during travel) so that current flows from the second energy store 34 via the second terminal poles 51, 52, the secondary side 58 and the primary side 56 via the two terminal poles 53 and 54 and the closed switches S1 and S2 to the first energy store 24 and charges same. In the electric machine arrangement 10, the charging device 50 therefore functions according to the invention as a DC/DC converter and therefore makes it possible to save an otherwise required separate DC/DC converter.

It should be noted that the features of the invention described with reference to individual embodiments or variants, such as for example the type and configuration of the individual switches, energy stores and electric machines and further components, and the spatial arrangement thereof, can also be present in other embodiments, unless stated otherwise or automatically ruled out for technical reasons. In addition, all of the features from amongst features of this kind, described in combination, of individual embodiments do not necessarily always have to be realized in a respective embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for charging energy stores of an electric machine arrangement for a motor vehicle, comprising:
   a primary side having a first terminal for connection to an electrical power supply system;
   a secondary side having a second terminal for connection to a second energy store;
   a third terminal on the primary side for connection to a first energy store;
   a control circuit for switching over load flows such that energy is transmitted from the second energy store via the second terminal to the first energy store via the third terminal, wherein
   at least one pole of the second terminal and one pole of the third terminal are immediately adjacent and connected in series.

2. The charging device as claimed in claim 1, wherein the third terminal and the first terminal are integrated to form a joint terminal.

3. The charging device as claimed in claim 1, wherein the charging device is configured for charging the first energy store designed as an energy store having power-optimized cells for providing a high power, and for charging the second energy store designed as an energy store having energy-optimized cells for providing a high energy.

4. The charging device as claimed in claim 1, wherein the charging device is configured for charging the first energy store and the second energy store to a voltage of 200 to 1000 V.

5. The charging device as claimed in claim 1, wherein the charging device is configured for charging the first energy store and the second energy store to a voltage of 260 to 400 V.

6. An electric machine arrangement for a motor vehicle, comprising:
a first electric machine;
a first energy store connected to the first electric machine for supplying electrical power thereto;
a second electric machine;
a second energy store connected to the second electric machine for supplying electrical power thereto; and
a charging device, wherein the charging device is connected between the first energy store and the second energy store and serves as a DC/DC converter for transmitting energy from the second energy store to the first energy store,
the charging device comprising:
a primary side having a first terminal for connection to an electrical power supply system;
a secondary side having a second terminal for connection to the second energy store;
a third terminal on the primary side for connection to the first energy store;
a control circuit for switching over load flows such that energy is transmitted from the second energy store via the second terminal to the first energy store via the third terminal wherein
at least one pole of the second terminal and one pole of the third terminal are immediately adjacent and connected in series.

7. The electric machine arrangement as claimed in claim 6, wherein
a switching arrangement is provided to produce and disconnect the connection between the first energy store and the third terminal of the charging device.

8. The electric machine arrangement as claimed in claim 7, wherein
the first energy store is an energy store having power-optimized cells for providing a high power, and
the second energy store is an energy store having energy-optimized cells for providing a high energy.

9. The electric machine arrangement as claimed in claim 6, wherein
the first energy store and the second energy store have an operating voltage of 200 to 1000 V.

10. The electric machine arrangement as claimed in claim 6, wherein
the first energy store and the second energy store have an operating voltage of 260 to 400 V.

11. A motor vehicle, comprising an electric machine arrangement as claimed in claim 6.

* * * * *